United States Patent
Muehllehner et al.

(10) Patent No.: US 7,557,350 B2
(45) Date of Patent: Jul. 7, 2009

(54) TIMING CALIBRATION USING RADIOACTIVE SOURCE

(75) Inventors: Gerd Muehllehner, Wayne, PA (US); Joel S. Karp, Glenside, PA (US)

(73) Assignees: Koninklijke Philips Electronics N.V., Eindhoven (NL); The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 11/814,375

(22) PCT Filed: Jan. 13, 2006

(86) PCT No.: PCT/IB2006/050130

§ 371 (c)(1), (2), (4) Date: Jul. 20, 2007

(87) PCT Pub. No.: WO2006/079935

PCT Pub. Date: Aug. 3, 2006

(65) Prior Publication Data

US 2008/0130838 A1   Jun. 5, 2008

Related U.S. Application Data

(60) Provisional application No. 60/647,993, filed on Jan. 28, 2005.

(51) Int. Cl.
*G01T 1/164* (2006.01)
(52) U.S. Cl. .............................. 250/363.03; 250/252.1
(58) Field of Classification Search ............ 250/363.03, 250/252.1
See application file for complete search history.

(56) References Cited

U.S. PATENT DOCUMENTS

| | | | |
|---|---|---|---|
| 5,272,343 A | 12/1993 | Stearns | |
| 5,272,344 A | 12/1993 | Williams | |
| 5,376,795 A * | 12/1994 | Hasegawa et al. | 250/363.04 |
| 5,591,977 A * | 1/1997 | Green et al. | 250/363.03 |
| 6,008,493 A | 12/1999 | Shao et al. | |
| 6,140,650 A | 10/2000 | Berlad | |
| 2002/0090050 A1* | 7/2002 | Nutt et al. | 378/19 |
| 2003/0146388 A1 | 8/2003 | Wainer | |
| 2004/0084625 A1 | 5/2004 | Williams et al. | |

OTHER PUBLICATIONS

Snyder et al. Image reconstruction from list-mode data in an emission tomography system having time-of-flight measurements, IEEE Transactions on Nuclear Science, vol. NS-20, No. 3 (Jun. 1983), pp. 1843-1849.*

Back, T., et al.; A TOF-PET system for educational purposes; 2002; Nuclear Instruments and Methods in Physics Research; A477; pp. 82-87.

* cited by examiner

*Primary Examiner*—David P Porta
*Assistant Examiner*—Shun Lee

(57) ABSTRACT

A cylinder (10) of radiation detectors (12) in a diagnostic imaging apparatus detects radiation pairs with corresponding electronic detector channels (22) which have non-uniform time-varying temporal delays. A plurality of calibration radiation sources (20) that concurrently emit radiation pairs is mounted at known positions inside of the cylinder. A temporal correction processor (46) uses the known positions of the calibration sources to determine errors in the relative detection times of radiation pairs from the calibration sources and uses the determined errors to generate corrections for the relative detection times of radiation pairs from radiopharmaceuticals injected in an imaged subject.

16 Claims, 2 Drawing Sheets

TIMING CALIBRATION USING RADIOACTIVE SOURCE

The present invention relates to the digital imaging arts. It finds particular application in conjunction with the calibration of Time-of-Flight Positron Emission Tomography (TOF-PET) imaging systems and will be described with particular reference thereto. However, it is to be appreciated that the invention may also find application in the calibration of Positron Emission Tomography (PET) scanners, coincidence-capable gamma camera medical imaging systems, and other types of nuclear cameras and diagnostic imaging systems where temporal calibrations are performed.

In nuclear medicine, a subject is injected with a radiopharmaceutical that carries a radioisotope which decays, emitting gamma radiation. Nuclear cameras detect the gamma radiation and reconstruct a diagnostic image illustrating a density of radioactive events in the subject.

In PET imaging, a positron annihilation event occurs which generates two gamma photons that are emitted simultaneously in opposite directions. PET imaging systems typically include rings of detectors which receive the emitted pair of gamma rays. To determine whether the gamma rays originated from the same event, their relative time of detection is analyzed to determine whether it is in a coincidence window, typically about 5-15 nanoseconds. The detection of radiation within this window is considered to be received simultaneously or coincidentally. The gamma camera determines a ray or line extending between the two detectors which coincidentally received gamma rays, the radiation event having occurred along this ray. Conventional reconstruction techniques are used to reconstruct the collection of rays into the diagnostic image showing the density of radiation events.

In Time-of-Flight Positron Emission Tomography (TOF-PET), the time between the coincident detections of each radiation event is measured. From the relative times of detection within the coincidence window, the location of the radiation event along the ray, or at least along a section of the ray, can be determined. With gamma radiation traveling at about 30 cm/ns, detector diameters on the order of 90-150 cm, and current system clocking speeds and hardware, the location of the event can be determined to a ray segment of about 3-5 cm. When these shorter ray segments are reconstructed, more precise diagnostic images result.

When measuring times on the order of fractions of a nanosecond or several picoseconds, the stability of the measuring hardware becomes important. Scintillation crystals, photodiodes or photomultiplier tubes, amplifiers, other electronic components, and even cabling can drift or vary with time, temperature, and the like. To accommodate for this drift, it is desirable to recalibrate TOF-PET scanners frequently. In TOF-PET scanners, frequent recalibration also helps to keep the coincidence window accurate.

Calibration can be performed in various ways. In one technique, radioactive point sources are positioned at known locations within the bore in which the subject will later be disposed. These point sources can be used to calibrate the relative delay among the various detector channels. However, a calibration procedure which substitutes precisely positioned point sources for the subject is time-consuming and disrupts optimal patient throughput.

Other techniques have been developed in which electrical pulses are introduced into each of the detection channels at, for example, the preamplifier or at the photomultiplier tube or the photodiode. These artificially injected electrical pulses can be used to calibrate the detection channels from the injection point downstream, but do not calibrate for timing variations in the photomultipliers or upstream electronics.

Another proposal has been to add light sources to each scintillator type detector. Such light sources allow an entire detector channel to be calibrated. However, adding light sources adds significant and complex hardware to the detection system.

The present invention provides a new and improved method and apparatus which overcomes the above-referenced problems and others.

In accordance with one aspect of the present invention, a diagnostic imaging apparatus is provided. A patient support supports a subject in an imaging bore which subject has been injected with a radiopharmaceutical which emits concurrent gamma radiation pairs. A cylinder of radiation detectors surrounds the bore to detect the radiation pairs, the detectors each being included in a corresponding one of a plurality of electronic detector channels which have non-uniform time varying drift. A plurality of calibration radiation sources that concurrently emit radiation pairs, the calibration radiation sources are disposed inside of the cylinder of radiation detectors and outside of the subject. A temporal calibration memory corrects non-uniform detector channel drift and a coincidence detector determines whether pairs of detected radiation events occurred within a selected coincidence window. A reconstruction processor reconstructs detection locations of coincident radiation pairs into an image representation. A calibration correction processor corrects the temporal calibration memory in accordance with radiation pairs received from the calibration radiation sources.

In accordance with another aspect of the subject invention, a method of diagnostic imaging is provided that comprises receiving gamma radiation pairs from at least one radiopharmaceutical radionuclide source with detector channels which have non-uniform time varying drift and receiving gamma radiation pairs from a plurality of calibration radiation emitting sources with the detector channels. The non-uniform detector channel delays are corrected utilizing a calibration memory. Coincident detected radiation pairs from the at least one radiopharmaceutical radiation source and the calibration sources are determined. Detection locations of the coincident pairs into an image representation are reconstructed and correction for the non-uniform time varying drift in accordance with the radiation pairs received from the calibration radiation sources are adjusted.

One advantage of the present invention is that it temporally calibrates complete detection paths.

Another advantage of this invention resides in its simplicity and minimal added hardware.

Yet another advantage of this invention is that it enables temporal calibration to be performed during diagnostic scans.

Still further advantages of the present invention will be appreciated to those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1:
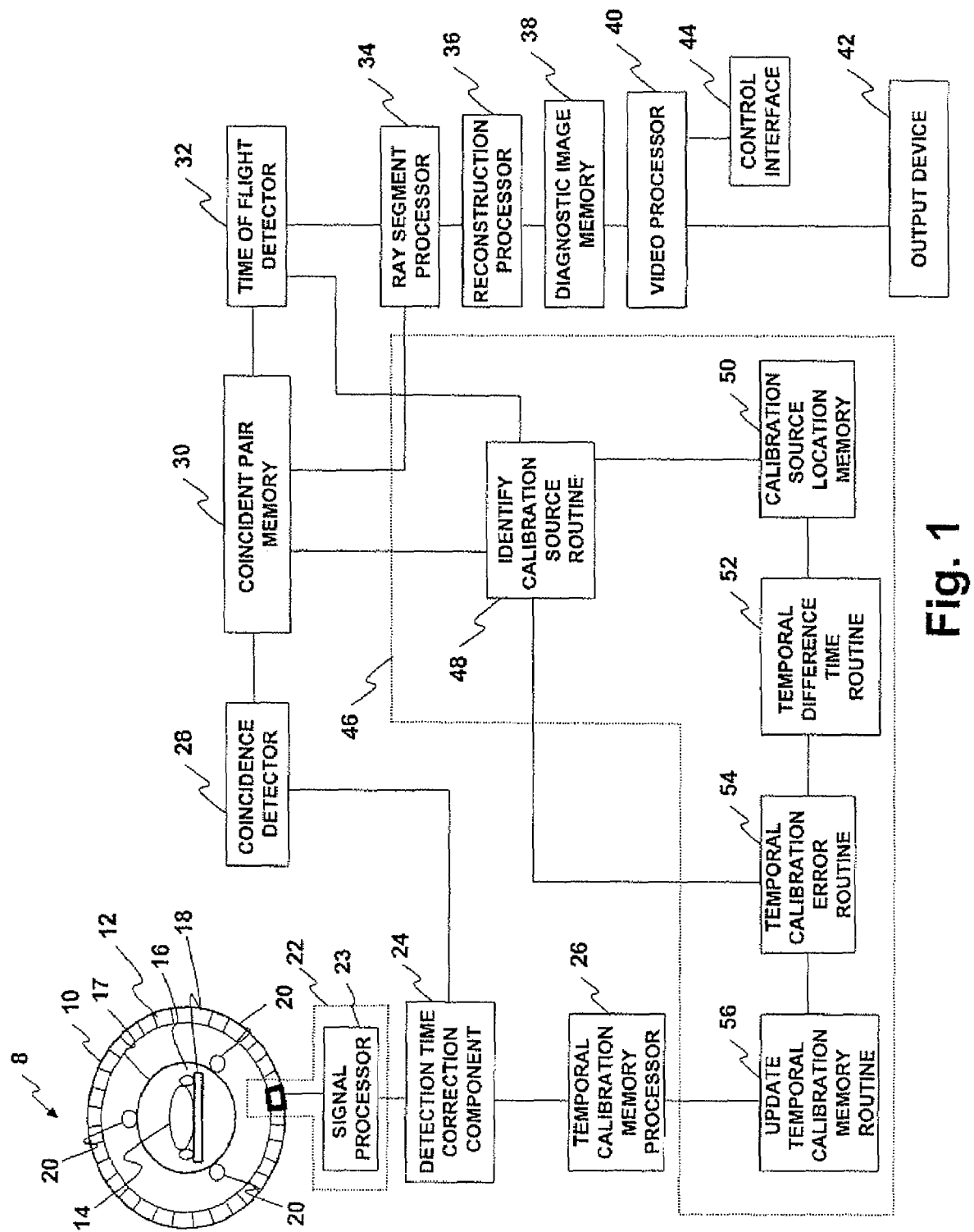
FIG. 1 is a diagrammatic illustration of a TOF-PET camera in accordance with the present invention.

With reference to FIG. 1, a PET scanner 8 includes a cylinder 10 in which radiation detectors 12 are mounted. Typically, the cylinder 10 is 90-150 cm in diameter and 30-90 cm in length. Preferably, the radiation detectors 12 are sufficiently small as to resolve the location of received radiation to within 1-5 mm. A subject 14 to be examined is positioned in a central bore 16. The bore 16 is typically enclosed by a cosmetic radiotranslucent plastic cylinder 17 of about 60-90 cm. The subject 14 is typically received on a patient support 18 which is movable axially into and out of the bore 16.

The subject 14 is injected with a radiopharmaceutical that includes a radioisotope that decays with a positron annihilation reaction. Typically, the radiopharmaceutical will emit about 15 million gamma rays/second, which are detectable by the detectors 12 within the cylinder 10. A plurality of positron annihilation radiation sources 20 are positioned inside the detector cylinder 10, but in positions which are known or readily determinable to be outside of the subject 14. In one embodiment, three calibration radionuclide sources 20 are mounted to the outside of the cosmetic cylinder 17. Preferably, the calibration sources are line sources which extend axially along the cylinder 17, but could also be a plurality of point sources. At one extreme, the cosmetic cylinder 17 can be completely coated with calibration radionuclide sources such that the point sources effectively form a continuous cylinder. Preferably, the calibration radiation sources 20 emit about one tenth of the number of detectable gamma rays as the radiopharmaceutical.

Preferably the calibration radionuclide sources 20 remain affixed in place during subject imaging. Alternatively, the calibration radionuclide sources 20 can be removed and reinserted into the PET scanner 8 at any time, as desired. In one approach, the calibration radionuclide sources 20 are employed to calibrate the PET scanner 8 before the subject 14 is introduced. After calibration is complete, the calibration radionuclide sources 20 are removed and the subject 14 is introduced to the PET scanner 8.

Each detector channel 22 includes one of the detectors 12 and associated electronics 23 which process an output of the detector 12 such as amplifying, filtering, or otherwise enhancing. In one embodiment, the detector includes a scintillator component (not shown), and a photodiode or photomultiplier tube (not shown) whose output is amplified by a preamplifier (not shown) of the associated electronics. The scintillator component can be comprised of crystals, a light guide and a photo cathode or diode, for example. In this manner, the scintillator component converts received gamma rays into light photons. A photodiode or photomultiplier tube reads the light output from the scintillation component and converts such light into an electrical signal such as a voltage or current, for example. This signal is amplified before transfer to a detection time correction component 24 by the preamplifier. Other radiation detectors are also contemplated such as solid state detectors that convert received radiation directly into an electrical output.

The detection time component 24 receives information related to its delay time relative to the other detector channels from a temporal calibration memory 26. In one embodiment, the relative delay information is in the form of a delay period which, when added to the measured delay of the channel, causes the channel to have a preselected delay, which preselected delay is common to all channels. The detected signals with the corrected delay are sent to a coincidence detector that searches for coincidentally detected (e.g., within 5 nanoseconds) events.

More specifically, as the detectors 12 detect radiation, the location of the detector is communicated to the temporal calibration memory 26 which supplies the delay (e.g., from a look-up table) which adjusts the channel's delay. Preferably, the temporal calibration memory 26 is initially calibrated using a positron annihilation phantom, but can also be completely calibrated dynamically as described below. The location and timing of the detected radiation events is communicated to the coincidence detector 28 which matches up pairs of radiation events that were detected within a preselected coincidence window. Events which do not pair up uniquely within the coincidence window are discarded.

The coordinate information identifying the location of coincident pairs and their relative times of detection are stored in a coincident pair memory 30. The detection coordinates identify the end points of the ray along which each detected radiation event occurred. In a TOF scanner, a time-of-flight detector 32 examines the relative time between the detection of the coincident events to determine where along the ray the radiation event occurred. With current technology, the location of the radiation event along the ray can be determined within about 3-5 cm. With continued development, it is anticipated that the accuracy with which the location of the radiation event along the ray is determined will improve. Optionally, detection time corrections can be made in the time of flight calculation rather than adding a standardized delay. A ray segment processor 34 determines the ray segment along which each detected radiation event occurred from the coordinates of each detected pair (e.g., as stored in the coincident pair memory 30) and the time-of-flight information (e.g., as stored in the time of flight detector 32).

A reconstruction processor 36 reconstructs the ray segments into a volumetric diagnostic image representation representing the density of radiation events, which diagnostic image representation is stored in a diagnostic image memory 38. A video processor 40 retrieves data from the image memory 38 and converts it into appropriate form and format for display on an output device 42, such as a video monitor, printer or central records electronic storage, for example. An operator utilizing a control interface 44 instructs the video processor 40 regarding the nature of the image to be displayed. Various image formats are anticipated, such as two-dimensional projections of the volumetric image representation, slices through the volumetric image representation, maximum intensity projections, surface renderings, and the like.

A temporal calibration correction processor 46 determines corrections to the temporal calibration memory 26 based on the received radiation from the calibration radiation sources 20. In the illustrated embodiment, a calibration source identification routine 48 identifies the pairs of radiation events which are attributable to the calibration radiation sources. Preferably, the calibration source identifier 48 causes the events from the calibration sources to be blocked from reaching the reconstruction processor 36 so that they do not appear in the reconstructed image representation.

Various techniques can be utilized for identifying the calibration sources 20. For example, the ray trajectory and relative detection times in association with the known location of the radiation sources 20 will identify the events from the calibration radiation sources. In the illustrated embodiment, in which the calibration sources 20 are disposed on the outside of the patient receiving cylinder 13, the calibration sources 20 are all more eccentrically located than radiation events from the subject. With this positioning, the pairs attributable to the calibration radiation sources 20 can be identified based on timing information only. However, position or ray information can be included to make the determination more accurate and to identify which of the plurality of calibration radiation sources 20 emitted the radiation. Preferably, the calibration source identifier 48 also identifies to which calibration source 20 the pair of detected gamma rays is attributable. The location need not be reconstructed precisely. Once the nearest calibration radiation source 20 is identified, its exact location is retrieved from a calibration source location memory 50. A temporal difference time routine 52 uses the precisely known location of the calibration radiation source 20 and the locations of the radiation detector 12 which received the calibration pair to determine the time-of-flight or temporal difference which should have been measured between their detections. A temporal calibration error routine 54 compares the measured time-of-flight time difference from the time-of-flight detector 32 with the calculated time difference from the temporal difference time routine 52.

In one approach, table calibrated time is determined utilizing a temporal calibration update routine 56 receives detector channel pair and timing error information and makes appropriate corrections to a temporal calibration memory or look-up table 26. In a preferred embodiment, the temporal calibration update routine 56 receives a plurality of the detector channel pair and timing error data sets and performs a statistical analysis of the sets to determine the appropriate corrections for each channel.

The calibration radiation sources 20 can be positioned at other locations, such as inside the patient bore 14, affixed to or embedded in the patient support 18 and the like. Alternatively or in addition, the location sources 20 can be positioned in known or accurately determinable locations which are uniquely differentiated from patient data.

The presently described temporal calibration correction system 46 can be used with or without time-of-flight image reconstruction. A conventional PET scanner without the time-of-flight measurement entering into the reconstruction can still benefit from having the temporal calibration look-up table recalibrated in the above-described manner.

Figure 2:
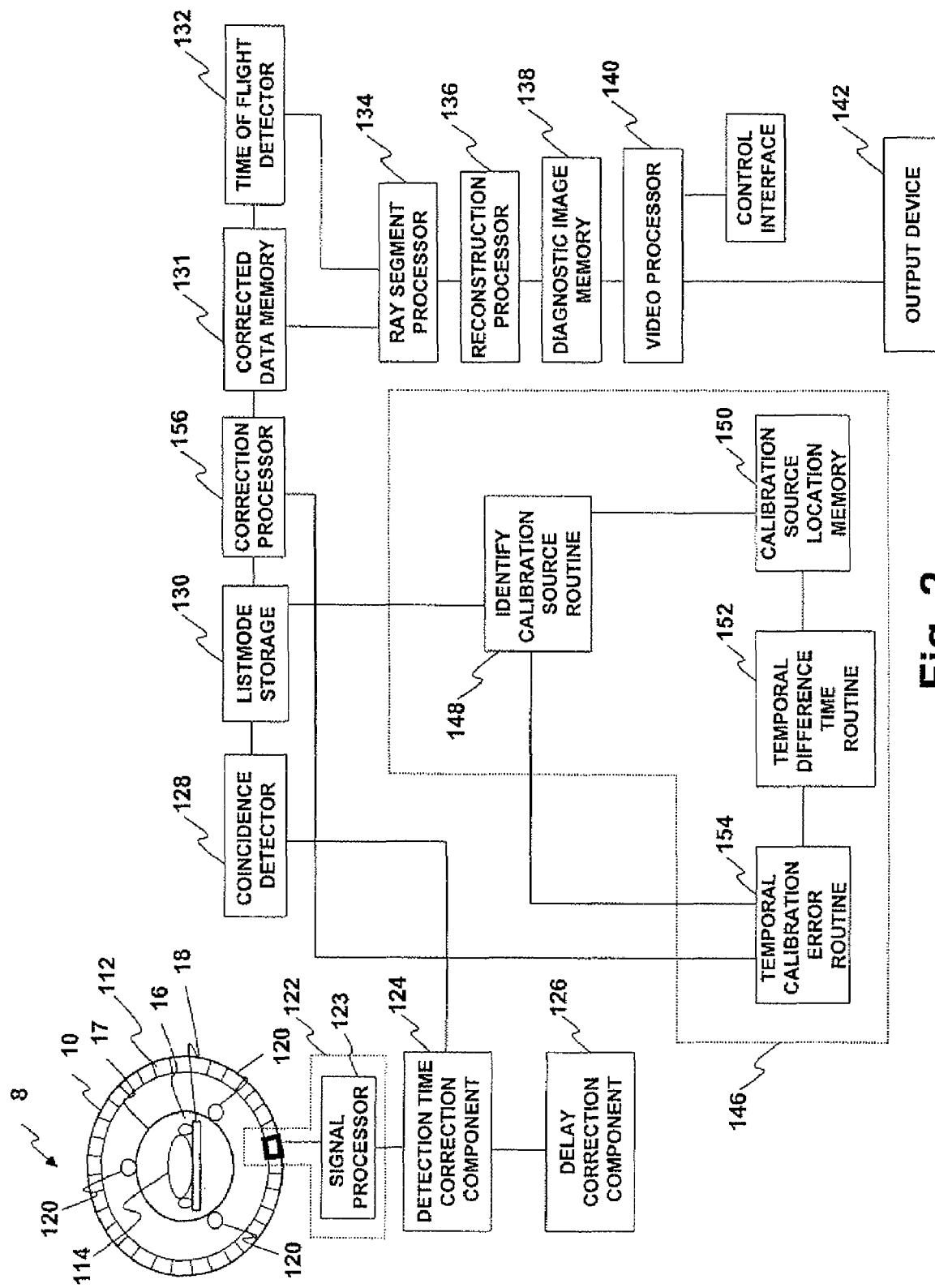
FIG. 2 is a diagrammatic illustration of the preferred embodiment of a TOF-PET camera in accordance with the present invention.

FIG. 2 illustrates a post-processing embodiment. The emission from a subject 114 and calibration sources 120 are received by detectors 112 and transmitted via a detector channel 122 which contains a signal processor 123. The signals are sent to a detection time correction component 124 which employs a delay correction component 126 that was previously calibrated to compensate for inherent delay variations in the channels that receive and process emissions. In this manner, delays related to components within each of the data channels 122 and the detection time correction component 124 can be identified and compensated employing the delay correction component 126. The delay correction component 126 can provide such compensation utilizing hardware and/or software resources. Data from the detection time component 124 is transmitted to a coincidence detector 128 which matches up pairs of radiation events detected within a preselected coincidence window. A listmode storage 130 stores such coincident pairs and transmits this data to a correction processor 156 along with the time stamps associated with each coincident pair.

A temporal calibration correction processor 146 determines corrections to the detection times based on the received radiation from the calibration radiation sources 120. In the illustrated embodiment, a calibration source identification routine 148 identifies the pairs of radiation events which are attributable to the calibration radiation sources 120. Once the nearest calibration radiation source 120 is identified, its exact location is retrieved from a calibration source location memory 150. A temporal difference time routine 152 uses the precisely known location of the calibration radiation source 120 and the locations of the radiation detector 112 which received the calibration pair to determine the time-of-flight or temporal difference which should have been measured between their detections. A temporal calibration error routine 154 compares the measured time-of-flight time difference from the time-of-flight detector 132 with the calculated time difference from the temporal difference time routine 152 and determines an appropriate adjustment to the correction times of the contemporaneously detected pairs. For example, the temporal calibration correction processor 146 determines the temporal correction periodically, e.g. every tenth or one-hundredth of a second. The determined correction is transmitted to the correction processor 156 and used for subsequent events until the next temporal correction is calculated. Alternatively, the temporal correction can be applied to coincident pairs within another selected temporal window of the temporal correction determination.

Data from the listmode storage is appropriately adjusted by the correction processor 156 and, optionally, stored in the corrected data memory or buffer 131. A time-of-flight detector 132 examines this corrected relative time between the detection of the coincident events to determine where along the ray the radiation event occurred. A ray segment processor 134 receives information from the time-of-flight detector 132 and the corrected data memory 131 and a reconstruction processor 136 reconstructs the ray segments received by the ray segment processor 134. This reconstructed information is sent via a diagnostic image memory 138 and a video processor 140 to an output device 142 for display to a user.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A diagnostic imaging apparatus including:
   a subject support adapted to support a subject in an imaging bore, which subject is injected with a radiopharmaceutical which undergoes radiation events which emit concurrent gamma radiation pairs;
   a cylinder of radiation detectors surrounding the bore to detect the radiation pairs, the detectors each being included in a corresponding one of a plurality of electronic detector channels which have non-uniform time varying drift;
   at least one calibration radiation source that undergoes radiation events which concurrently emit radiation pairs, the at least one calibration radiation source being disposed inside of the cylinder of radiation detectors and outside of the subject;
   a coincidence detector which determines whether pairs of detected radiation events occurred within a selected coincidence window;
   a listmode storage that stores detection locations and the relative detection times of each coincident pair from the coincidence detector;
   a correction processor that determines temporal corrections to the determined relative detection times of the coincident pairs from the subject radiopharmaceutical in accordance with the determined relative detection times of the detected radiation events of the coincident pairs received from the at least one calibration radiation source, and that adjusts relative detection times of the subject radiopharmeceutical stored in the listmode storage;
   a time-of-flight detector which examines the corrected relative detection times of the detected radiation events of each of the coincident pairs from the subject radiopharmaceutical to determine where along a ray between the detection locations of each coincident pair one of the radiation events occurred;

a ray segment processor that determines a ray segment corresponding to each coincident pair from the subject radiopharmaceutical in accordance with the detection locations and where along each ray a corresponding radiation event occurred;

a reconstruction processor which reconstructs an image representation based on the ray segments.

2. The diagnostic imaging apparatus according to claim 1, further including:

a diagnostic image memory which stores the image representation; and a video processor that retrieves data from the diagnostic image memory and converts it into appropriate form and format for display on an output device.

3. The diagnostic imaging apparatus according to claim 1, further including:

a radiotranslucent cylinder which defines the imaging bore, the at least one calibration radiation source being mounted to the radiotranslucent cylinder.

4. The diagnostic imaging apparatus according to claim 3, wherein the at least one calibration radiation source includes at least three radiation sources disposed at intervals around the radiotranslucent cylinder.

5. A diagnostic imaging apparatus comprising:

a subject support configured to support in an imaging bore a subject who has been injected with a radiopharmaceutical which emits concurrent gamma radiation pairs;

a cylinder of radiation detectors surrounding the bore to detect the emitted radiation pairs, each of the detectors being associated with a corresponding one of a plurality of electronic detector channels which channels have non-uniform time varying drift;

a plurality of calibration radiation sources that concurrently emits radiation pairs, the calibration radiation sources being disposed inside of the cylinder of radiation detectors and outside of the subject;

a coincidence detector determines whether pairs of detected radiation events occurred within a selected coincidence window;

a time-of-flight detector which determines relative detection times of the coincident pairs of radiation events from the subject radiopharmaceutical and from the calibration radiation sources;

a correction processor including:
 a location memory for storing a location of the calibration radiation sources;
 a calibration source identification routine that identifies the coincident pairs from each of the calibration radiation sources based on the relative detection times of the coincident pairs and which pair of the radiation detectors detect each pair;
 a temporal difference time routine that determines changes in the determined relative detection times of the radiation events from the at least one calibration radiation source;
 an error routine that determines a temporal correction to compensate for the non-uniform, time varying drift for each of the electronic detector channels from the changes in the relative detection times of the radiation events from the at least one calibration radiation source;

a detection time correction component which corrects the relative detection times of the coincident pairs of the radiation events from the subject radiopharmaceutical in accordance with the temporal corrections;

a reconstruction processor reconstructs detection locations of coincident radiation pairs from the radiopharmaceutical into an image representation.

6. The diagnostic imaging apparatus according to claim 5, further including:

a listmode storage that stores detection locations and relative detection times of each coincident pair from the coincidence detector, the detection time correction component correcting the relative detection times stored by the listmode storage.

7. The diagnostic imaging apparatus according to claim 5, further including:

a calibration memory which receives the temporal corrections from the correction processor, provides corrections to the correction time for each channel to the detection time correction component; and a calibration memory updating routine which updates the calibration memory in accordance with determined temporal connections concurrently with detecting the radiation pairs emitted by the radiopharmaceutical injected in the subject.

8. The diagnostic imaging apparatus according to claim 5, wherein the plurality of calibration radiation sources includes at least one of line sources and point sources.

9. A method of diagnostic imaging, comprising:

receiving gamma radiation pairs from a radiopharmaceutical radiation source with detector channels which have non-uniform time varying drift;

receiving gamma radiation pairs from at least one calibration radiation emitting source with the detector channels;

determining coincident detected radiation pairs from the radiopharmaceutical radiation source and the at least one calibration source;

storing detection locations and relative detection times for the radiation pairs from the radiopharmaceutical radiation source;

determining temporal corrections for the non-uniform time varying detector channel drifts in accordance with the radiation pairs received from the at least one calibration radiation source;

correcting the stored relative detection times of the detected radiation pairs from the radiopharmaceutical radiation source with the temporal correction to correct for the non-uniform, time varying detector channel drifts; and reconstructing an image representation from the corrected coincident pairs from the radiopharmaceutical source.

10. The method according to claim 9, further including:

determining time-of flight time intervals between the detection times of the radiation pairs from the radiopharmaceutical radiation source and the calibration radiation sources, wherein correcting the stored relative detection times includes correcting the time-of-flight intervals.

11. The method according to claim 10, wherein there are a plurality of calibration sources and the method further including:

identifying the calibration radiation source that emitted each calibration source radiation pair based at least in part on relative detection times of each calibration source radiation pair; and determining from the calibration source radiation pairs a relative detection time correction.

12. The method according to claim 11, further including: analyzing the relative detection time corrections to determine the corrections.

13. The method according to claim 9, further including: removing the at least one calibration source prior to imaging a subject.

14. The method according to claim 9, wherein radiation pairs from the at least one calibration radiation source and the radiopharmaceutical radiation source are received concurrently.

15. The method according to claim 9, wherein the at least one calibration radiation source emits radiation at less than ten percent of an emission rate of the radiopharmaceutical radiation source.

16. A time-of-flight positron emission imaging device including a processor programmed to perform the method according to claim 9.

* * * * *